(12) United States Patent
Chen et al.

(10) Patent No.: US 7,051,158 B2
(45) Date of Patent: May 23, 2006

(54) SINGLE COMPUTER DISTRIBUTED MEMORY COMPUTING ENVIRONMENT AND IMPLEMENTATION THEREOF

(75) Inventors: Tianlong Chen, Gaithersburg, MD (US); Yingbin Wang, Falls Church, VA (US); Yinong Wei, Fairfax, VA (US); Jonathan Vu, Fairfax, VA (US)

(73) Assignee: InteliTrac, Inc., Rockville, MD (US)

( * ) Notice: Subject to any disclaimer, the term of this patent is extended or adjusted under 35 U.S.C. 154(b) by 419 days.

(21) Appl. No.: 10/425,729

(22) Filed: Apr. 30, 2003

(65) Prior Publication Data

US 2004/0221122 A1    Nov. 4, 2004

(51) Int. Cl.
*G06F 12/00* (2006.01)

(52) U.S. Cl. ...................... 711/117; 711/118
(58) Field of Classification Search ................ 711/147, 711/148, 153, 173
See application file for complete search history.

(56) References Cited

U.S. PATENT DOCUMENTS 5,157,778 A * 10/1992 Bischoff et al. .............. 703/14
5,914,727 A * 6/1999 Horan et al. ................ 345/503
6,385,668 B1 * 5/2002 Gaddess et al. .............. 710/8
6,912,641 B1 * 6/2005 Chen et al. ................ 711/170

\* cited by examiner

*Primary Examiner*—T Nguyen
(74) *Attorney, Agent, or Firm*—Z4IP Law Group USA, PLLC; Timothy R. Dewitt

(57) ABSTRACT

A computing environment for a device having a processor, a device memory and an operating system. A first process running in the operating system has a memory and a memory cache. A second process running in the operating system has a second process memory accessible to the first process. A communication channel between the first process and second process makes the second process memory available for the first process memory to use. The device memory is sectioned into memory blocks, each having a starting address. A block ID identifies the memory block. Data is stored in various memory units of the memory block. An offset ID identifies the memory unit. A DMCE Virtual address contains the offset ID, the block Id and a device ID for identifying the memory unit. The DMCE virtual address of a memory unit used for the memory function is copied into the memory cache.

24 Claims, 10 Drawing Sheets

SINGLE COMPUTER DISTRIBUTED MEMORY COMPUTING ENVIRONMENT AND IMPLEMENTATION THEREOF

CROSS-REFERENCE TO RELATED APPLICATIONS

Memory-Resident Database Management System and Implementation Thereof; application Ser. No. 10/347,678; Filed Jan. 22, 2003; Inventors: Tianlong Chen, Jonathan Vu.

Distributed Memory Computing Environment and Implementation Thereof; application Ser. No. 10/347,677, Filed on Jan. 22, 2003; Inventors: Tianlong Chen, Jonathan Vu, Yingbin Wang.

Invariant Memory Page Pool and Implementation Thereof; application Ser. No. 10/425,730, Filed on Apr. 30, 2003; Inventors: Tianlong Chen, Yingbin Wang, Yinong Wei.

Central Linked List Data Structure and Methods of Use; Filed Jul. 9, 2002, Provisional Application Ser. No. 60/394,257; Inventor: Jonathan Vu.

The above cross-referenced related applications are all hereby incorporated by reference herein in their entirety.

STATEMENT REGARDING FEDERALLY SPONSORED RESEARCH OR DEVELOPMENT

Not applicable.

BACKGROUND OF THE INVENTION

1. Field of the Invention

The present invention relates broadly to distributed memory computing, and more specifically to distributed memory computing within a device.

2. Description of the Related Art

Due to the limitations of computer systems and operating systems running on computers, one process normally has limited access to the amount of memory it can use. In 32-bit operating systems, a process can normally access a maximum of 4 gigabytes (GB) of virtual memory without using disk-based swap files. In 64-bit operating systems, a process theoretically can access more than 4 GB of virtual memory, but those 64-bit operating systems still have similar, although slightly different, upper limitations on how much physical memory a process can access without using disk-based swap files.

Although the prior devices generally functioned well and provided advantages over prior devices, they did not provide users with a maximized amount of virtual memory, or a memory management capability beyond that dictated by the operating system.

SUMMARY OF THE INVENTION

The present invention has been made in view of the above circumstances and has as an aspect the provision of a system and method for distributed memory computing within a single computer. Still another aspect of the present invention is a system and method for running one process within a single computer to access more than 4 GB memory with a 32-bit operating system. Still another aspect of the present invention is running one process within a single computer to access memory from multiple other processes for any operating system (called cross-process Distributed Memory Computing Environment or cross-process DMCE, or In-Server DMCE). Yet another aspect of the present invention is to provide a cross-process DMCE memory cache. Still another aspect of the present invention is to provide a system and method of overcoming upper memory access limitations of a process in any operating system.

Yet another aspect of the present invention is to provide a system and method of providing a memory messaging channel in a cross-process DMCE computing environment.

A computing environment for a device having a processor, a device memory and an operating system. A first process running in the operating system has a memory and a memory cache. A second process running in the operating system has a second process memory accessible to the first process. A communication channel between the first process and second process makes the second process memory available for the first process memory to use. The device memory is sectioned into memory blocks, each having a starting address. A block ID identifies the memory block. Data is stored in various memory units of the memory block. An offset ID identifies the memory unit. A DMCE Virtual address contains the offset ID, the block Id and a device ID for identifying the memory unit. The DMCE virtual address of a memory unit used for the memory function is copied into the memory cache.

Still other aspects, features, and advantages of the present invention are readily apparent from the following detailed description, simply by illustrating preferable embodiments and implementations. The present invention is also capable of other and different embodiments, and its several details can be modified in various respects, all without departing from the spirit and scope of the present invention. Accordingly, the drawings and descriptions are to be regarded as illustration in nature, and not as restrictive.

BRIEF DESCRIPTION OF THE DRAWINGS

The accompanying drawings, which are incorporated in and constitute a part of this specification illustrate some embodiments of the invention and, together with the description, serve to explain the objects, advantages, and principles of the invention. In the drawings.

DETAILED DESCRIPTION OF THE PREFERRED EMBODIMENTS

Figure 1:
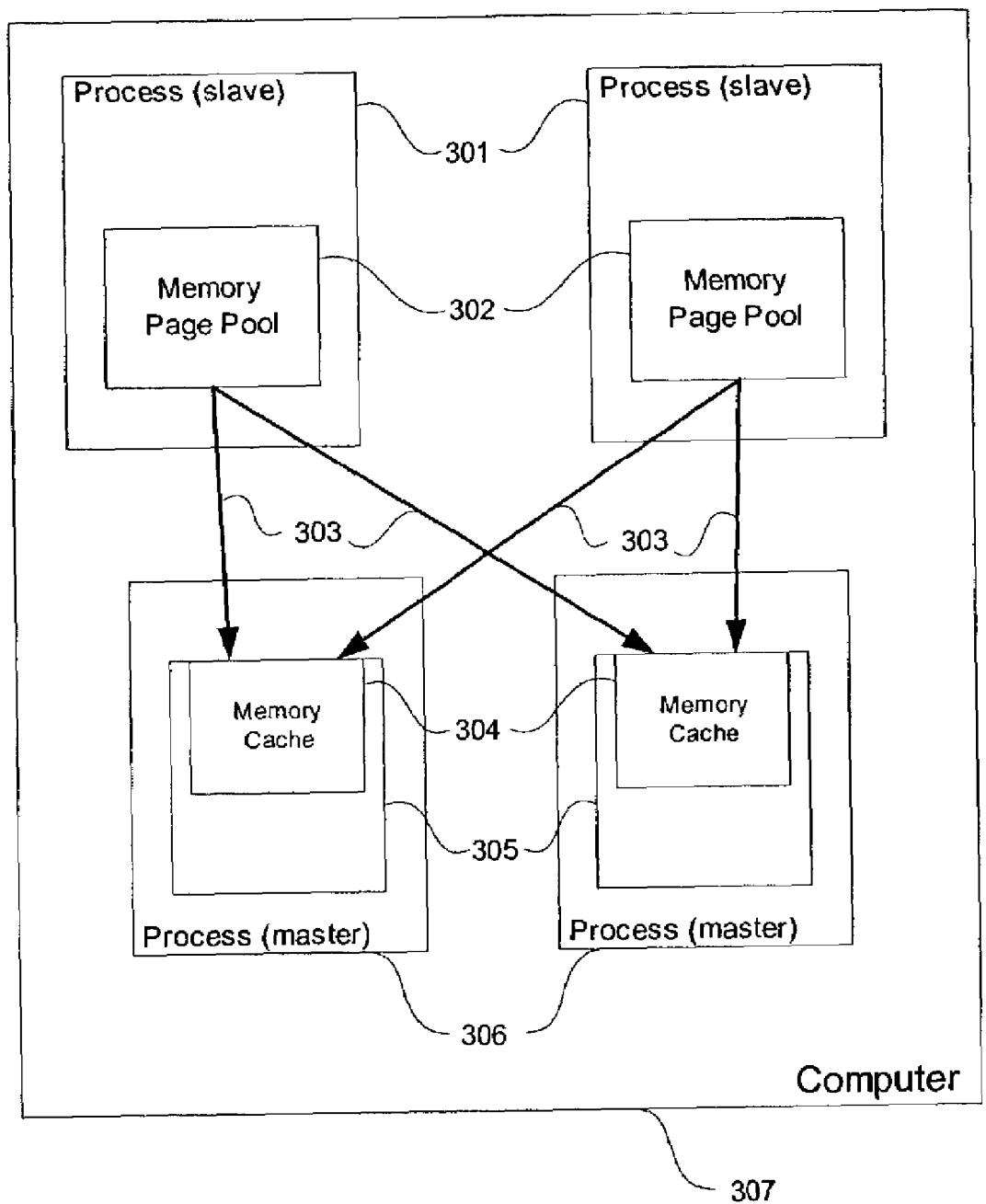
FIG. 1 illustrates a conceptual block diagram of a preferred embodiment of a Distributed Memory Computing Environment in a single computer in accordance with the present invention.

The present invention relates to distributed memory computing, and references related patent applications throughout the specification. A preferred embodiment of the present invention is shown in FIGS. 1–10. Referring to FIG. 1, a device 307, for example a computer, with a process 306 (called master), which borrows memory from other processes 301 (called slave) within a single computer 307. The total accessible memory of a master process 306 is the sum of the memory 302 from slave processes 301 and the master processes' own memory 305. The embodiment of FIG. 1 illustrates the device 307 as a computer. However, the present invention may be practiced with any kind of device having a processor and a memory, including, not limited to, a server, a desktop computer, a laptop computer, a PDA, a tablet computer, a cell phone, and many others.

The master process 306 is assigned a block of memory, called a memory cache 304, as part of the master process' memory 305 of the device 307. The slave process 301 is allocated a block of memory in memory of the device 307, called a memory page pool 302.

Still referring to FIG. 1, the master process 306 borrows memory from multiple slave processes 301, and one slave process 301 can lend its memory 302 to multiple master processes 306. Each Memory Page Pool 302 is partitioned into memory pages in order to manage memory efficiently in each slave process. The size of memory pages in each Memory Page Pool 302 is configurable. The size of memory pages may differ from one memory page pool 302 to another. The number of pages in each memory page pool 302 may differ. However, memory pages in the same Memory Page Pool 302 preferably are the same size. Embodiments of a memory page pool 302 which, for example, may be used with the present invention are described in patent application "Invariant Memory Page Pool and Implementation Thereof," application Ser. No. 10/425,730, Filed on Apr. 30, 2003, Inventors: Tianlong Chen, Yingbin Wang, Yinong Wei. The present invention, however, is not limited to use with the memory page pool embodiments of that application, and, in fact, could be used with other embodiments of memory page pools.

Figure 2:
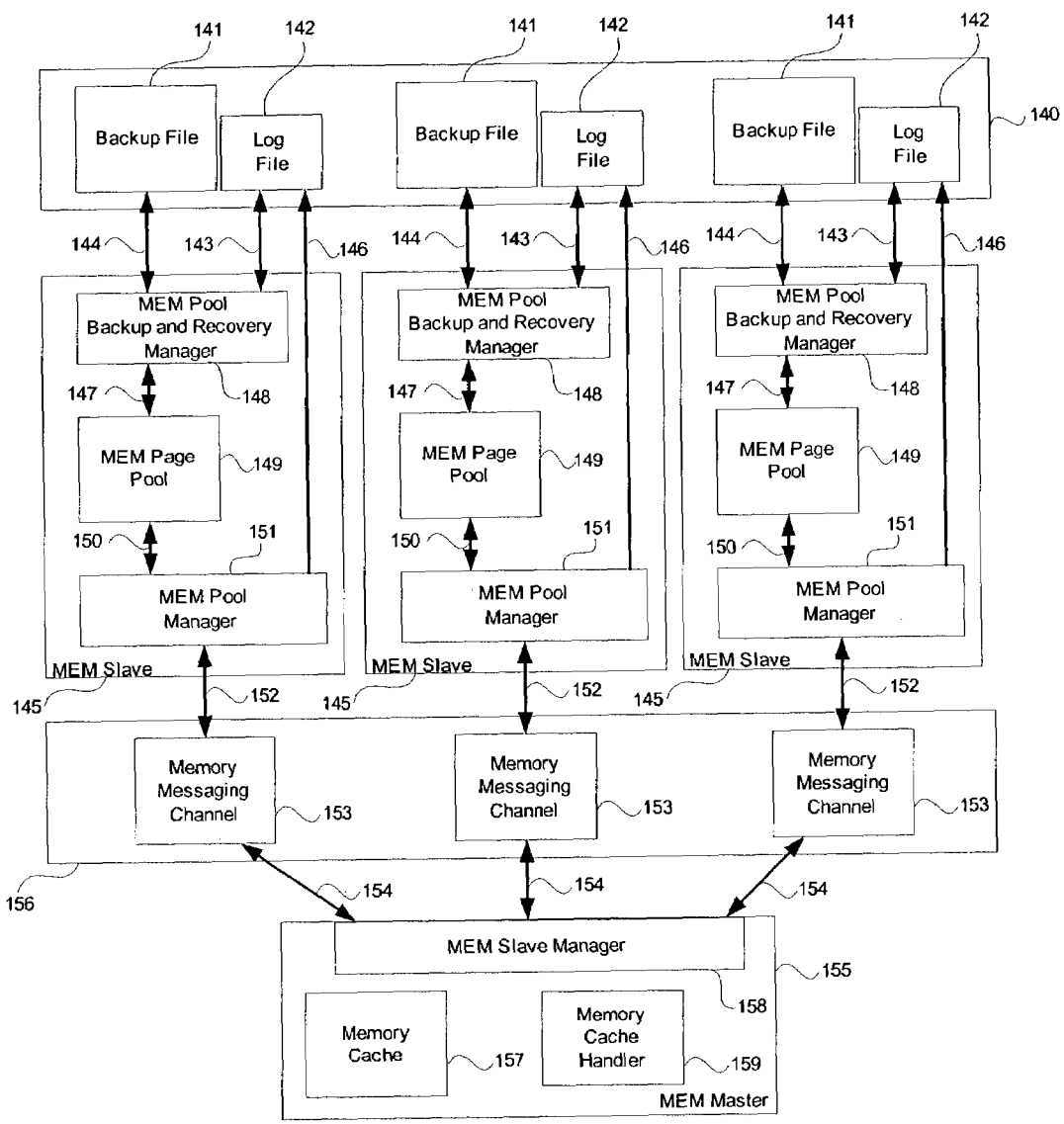
FIG. 2 illustrates a conceptual block diagram of a preferred embodiment of an Extended Memory Management Unit (EMMU) system in a single computer DMCE in accordance with the present invention.

Referring to FIG. 2, an Extended Memory Management Unit (EMMU) 100 in accordance with the present invention is illustrated. The EMMU 100 includes Memory Slaves 145 in slave processes, Memory Masters 155 in master processes, and Memory Messaging Channels (MMC) 153, which collectively are called Memory Information Exchange (MIE) layer 156. In the Extended Memory Management Unit (EMMU) 100 in a single computer, a backup and recovery subsystem 140 is illustrated. The overall backup and recovery system as disclosed in patent application Ser. No.: 10/347,677 for "Distributed Memory Computing Environment and Implementation Thereof"; Ser. No. 10/347,678 "Memory-Resident Database Management System and Implementation Thereof"; and for "Invariant Memory Page Pool and Implementation Thereof, application Ser. No. 10/425,730, Filed on Apr. 30, 2003; Inventors: Tianlong Chen, Yingbin Wang, Yinong Wei.

Still referring to FIG. 2, Memory Slaves 145 (also referred to as MEM Slave) and Memory Masters 155 (also referred to as MEM Master) communicate with each other through a Memory Messaging Channels 153 in Memory Information Exchange layer 156. Memory Master 155 has functional logic, referred to herein as Memory Slave Manager 158, to handle communication with Memory Slaves 145 for memory slave management functions, such as starting and initializing Memory Slaves 145. Memory Master 155 has a block of memory used as Memory Cache 157 (also referred to as DMCE Memory Cache) and Memory Cache handling logic 159. As an optional function, Memory Master 155 can keep a disk based log file for backup and recovery (not shown).

Still referring to FIG. 2, each Memory Slave 145 has a Memory Page Pool 149 and a Memory Pool Manager 151 to handle management of its Memory Page Pool 149 and communication with the Memory Masters 155. The Memory Pool Manager 151 manages the Memory Page Pool 149, performing, for example, memory page pool initialization, memory allocation, memory read, memory write, memory free functions, and other optional functions, such as memory pool status monitoring. Various embodiments of a Memory Page Pool are described in patent application Ser. No. 10/347,678 for "Memory-Resident Database Management System and Implementation Thereof", and patent application for "Invariant Memory Page Pool and Implementation Thereof," application Ser. No. 10/425,730, Filed on Apr. 30, 2003; Inventors: Tianlong Chen, Yingbin Wang, Yinong Wei.

Referring to FIG. 2, Memory Cache 157 is a block of memory in Memory Master 155, which stores local copies of data managed by the Memory Master 155. For example, when Memory Master 155 wants to read the information stored in memory pages borrowed from Memory Slaves 145, the Memory Cache Handler 159 first copies the targeted memory pages through Memory Messaging Channel 153 from Memory Slaves 145 to Memory Cache 157 in Memory Master 155. Then, Memory Master 155 can read the local copies for targeted information from the Memory Cache 157. Similarly, when Memory Master 155 wants to write information to targeted memory pages in Memory Slaves 145, Memory Master 155 first writes the information in Memory Cache 157. Then, Memory Cache Handler 159 writes the information to corresponding memory pages in Memory Slaves 145 through Memory Messaging Channel 153, if memory pages have been allocated in Memory Slaves 145 before the writing. No memory page writing will occur before the page is ever allocated.

Figure 3:
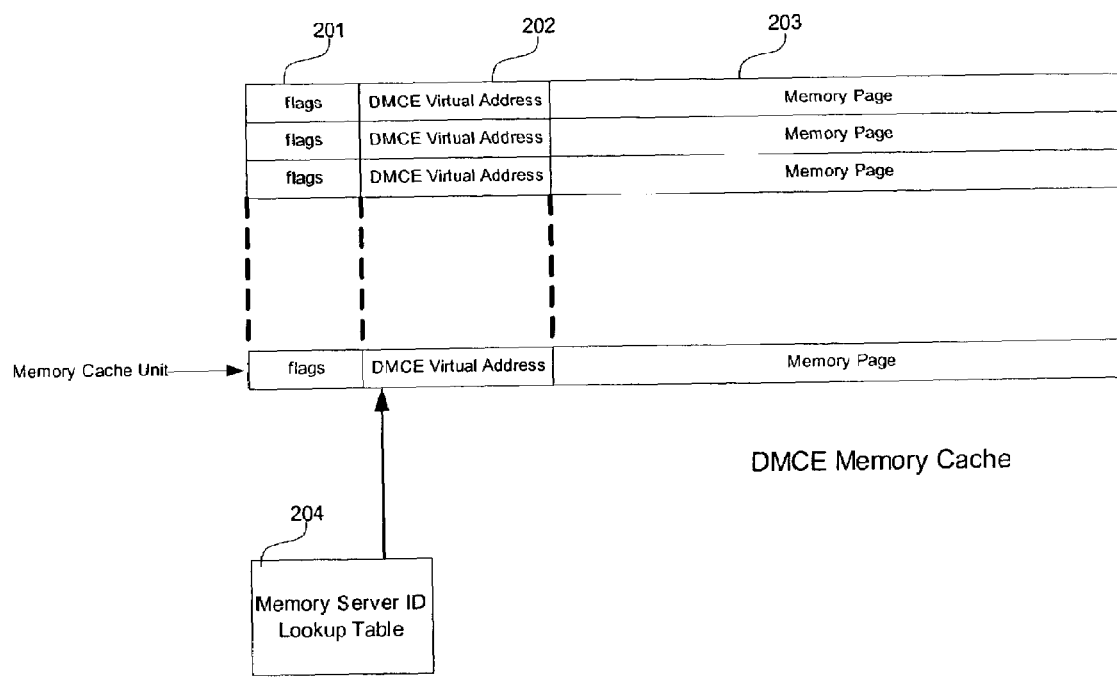
FIG. 3 illustrates a conceptual block diagram of a preferred embodiment of a Memory Cache used in Distributed Memory Computing Environment, or DMCE Memory Cache, in accordance with the present invention.

Referring to FIG. 3, a preferred embodiment of a DMCE Memory Cache in accordance with the present invention is illustrated. The DMCE Memory Cache 220 has one or more Memory Cache Units 200. Each Memory Cache Unit 200 contains at least a DMCE Virtual Address 202, a memory page 203, and a flag 201. The DMCE Virtual Address 202 is the address that corresponds to the memory page in Memory Slave 145. The memory page 203 contains content that is either written back to Memory Slave 145 or read from Memory Slave 145. The flag 201 tracks the status of the memory page 203 for the Memory Cache Handler. Since the Memory Cache 220 is normally a limited-sized memory block, Memory Cache Handler has logic instructions for determining how and when to replace memory pages 203 and their corresponding DMCE Virtual Addresses 202, when memory pages are needed by Memory Master 155 for reading or writing.

Still referring to FIG. 3, the flags 201 at least contain information to indicate whether the memory page 203 has been changed by Memory Master 155 and the memory page should be later written back to Memory Slave 145. The flags 201 may contain information to indicate the associated memory page 203 is currently being read, and should not be replaced. The functionality and logic for Memory Cache is similar to a cache for a CPU in a computer, where the cache buffers information retrieved from the main memory for the CPU to process. In such a case, the CPU operates as a Memory Master 155 and the main memory operates as a Memory Slave 145.

Still referring to FIG. 3, a Memory Server ID Lookup Table 204 is used in order to find where a memory block is located. An embodiment of a Memory Server ID Lookup Table 204 and a Memory Block ID Lookup Table is described in the patent application for "Invariant Memory Page Pool and Implementation Thereof," application Ser. No. 10/425,730, filed on Apr. 30, 2003; Inventors: Tianlong Chen, Yingbin Wang, Yinong Wei. The Memory Server ID Lookup Table 204 stores not only the Server information but also the process information when one server has multiple processes to handle different memory blocks.

Referring to FIG. 2, the communication channel between Memory Master 155 and Memory Slave 145 is the Memory Messaging Channel 153. The Memory Messaging Channel 153 may be implemented in a variety of ways. For example, and without limitation, an Inter-Process Communication (IPC), inter-process Message Queue, TCP/IP socket, or the like, may be used. Embodiments of a shared-memory based method for Memory Messaging Channel 153 are disclosed in patent application Ser. No. 10/347,678 "Memory-Resident Database Management System and Implementation Thereof."

Figure 4:
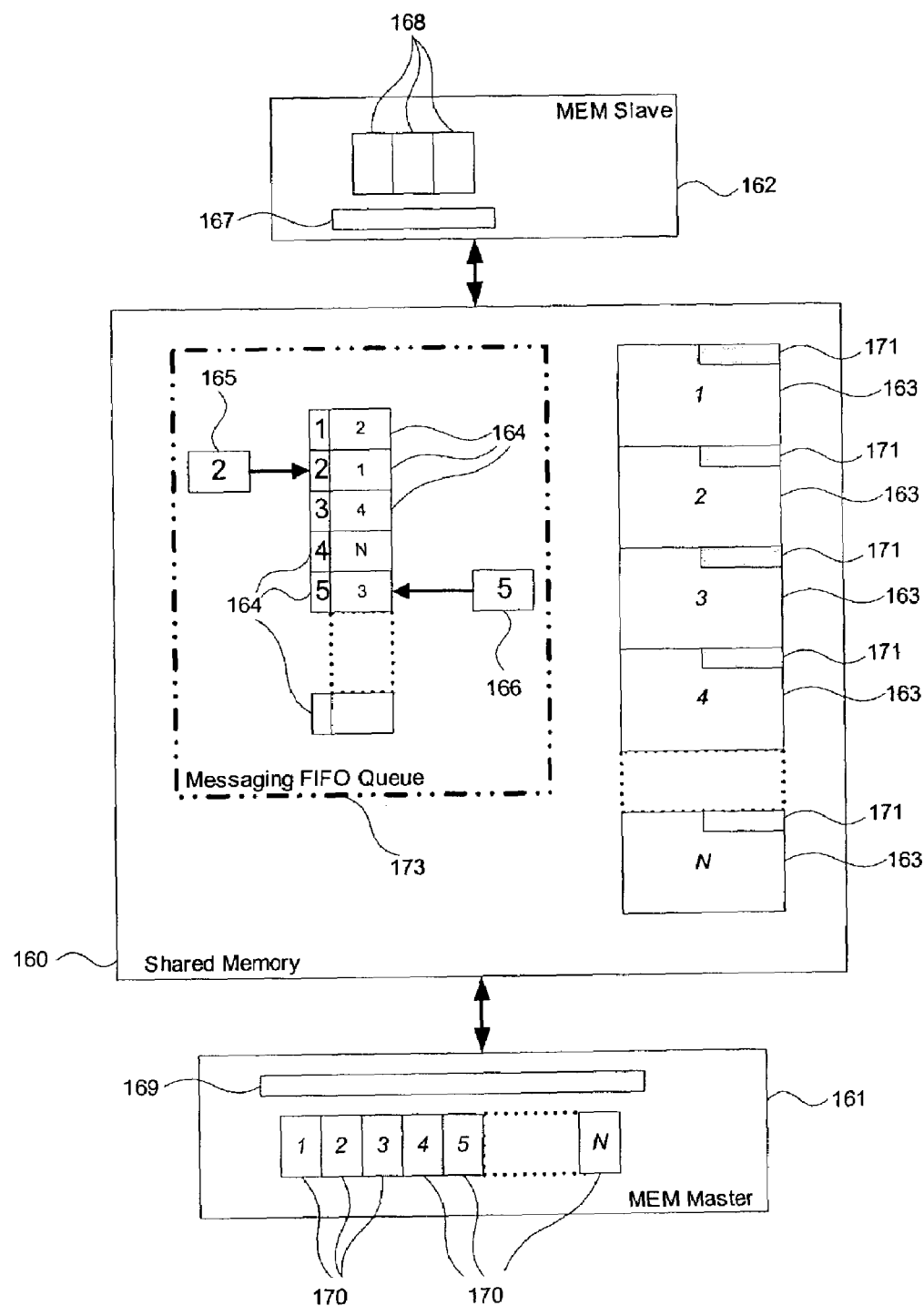
FIG. 4 illustrates a conceptual block diagram of a preferred embodiment of a Memory Information Exchange (MIE) layer using a shared-memory-based messaging architecture in accordance with the present invention.

Referring to FIG. 4, an embodiment of a shared-memory based Memory Messaging Channel implementation is illustrated. A Memory Master 161 communicates with Memory Slave 162 through a shared-memory based Memory Messaging Channel. The Memory Master 161 is multithread. However, it will be appreciated by one skilled in the art that Memory Master 161 may be single thread. Each thread 170 is indexed by an integer. Each thread 170 is a memory consumer in Memory Master 161, looking to allocate memory pages, read memory pages, write memory pages, or free memory pages. Memory master 161 sets a semaphore 169 to synchronize the thread's memory request. Similarly, Memory Slave 162 can be multithreaded to provide virtually concurrent processing to memory requests from Memory Master 161, with a semaphore 167 synchronizing the memory processing of each thread 168.

Still referring to FIG. 4, each thread 170 has its own Messaging Block 163 in shared-memory based Memory Messaging Channel (as shown in FIG. 2), in which the memory space 171 is used as a flag to indicate messaging block status, such as Master is writing, or Slave is writing and etc. A Messaging FIFO (First-In-First-Out) Queue (MFQ) 173 is used to track the order in which a thread 170 sends a message. Memory Slave 162 will read from this MFQ 173 to know which Messaging Block 163 should be processed next. The size of Messaging Block 163 is configurable.

Still referring to FIG. 4, Messaging FIFO Queue (MFQ) 173 can be implemented as a circular array if the maximum number of queue nodes 164 is known, or can be implemented as a linked list if unknown. A preferred embodiment of the MFQ 173 is a circular integer array with the number of integers 165 greater or equal to the maximum number of threads 170 in Memory Master 161 that can communicate with Memory Slave 162. At the beginning, all integers in the circular array are initiated as an invalid index such as −1.

Figure 5:
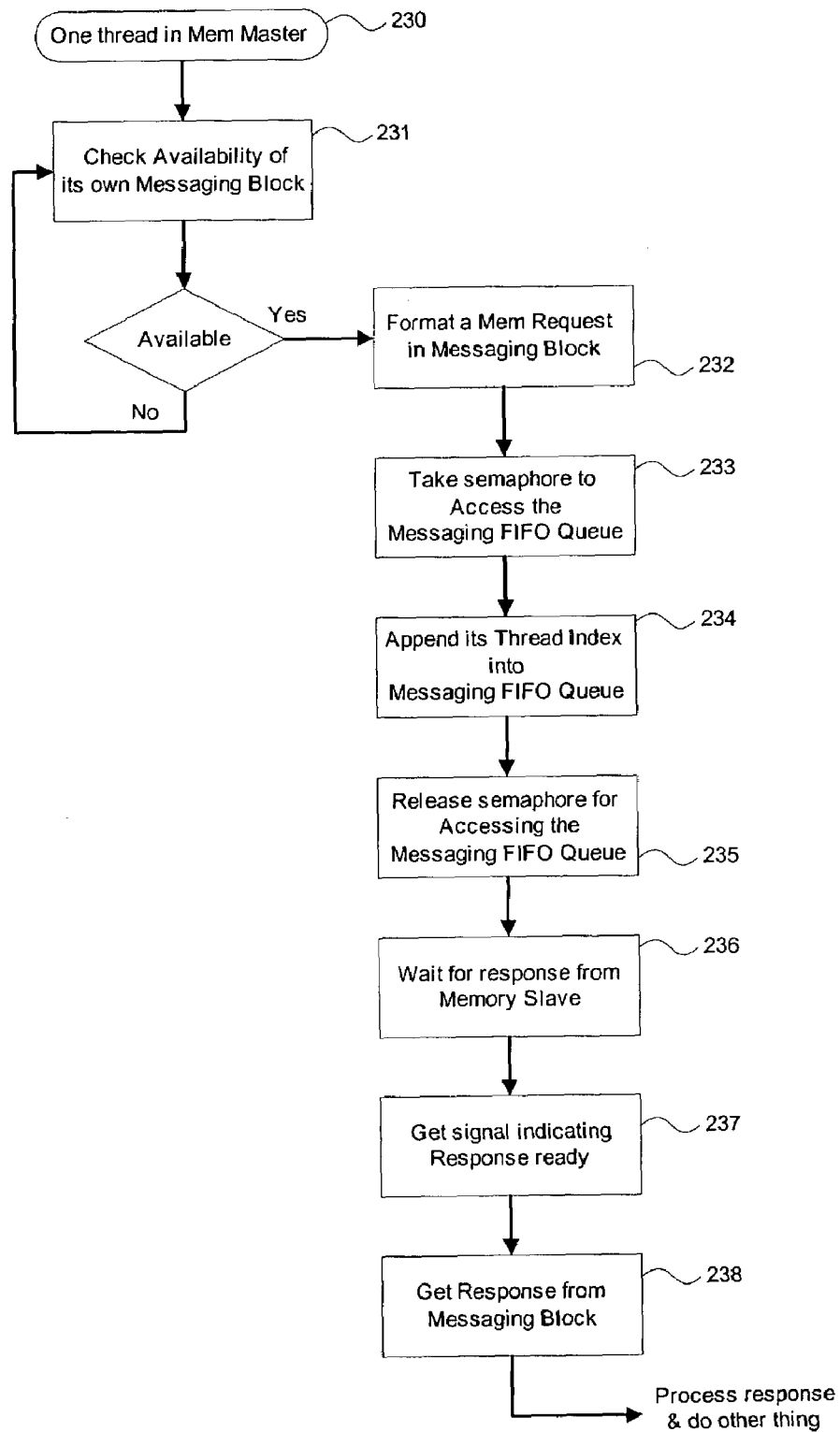
FIG. 5 illustrates a method for exchanging information between a Memory Master thread and a Memory Slave, using an MIE layer, in accordance with the present invention.

Referring to FIG. 4 and FIG. 5, when one thread 170 in the Memory Master 161 makes a memory action (malloc, read, write and free or status)(step 230), it first checks the flag 171 in its own Messaging Block 163 whether its own Messaging Block 163 is available for memory action (step 231). It is normally available. Then the thread 170 writes its request to the messaging block 163 based on pre-defined Memory Messaging Protocol (further described below) and resets the flag 171 (step 232). Next, the semaphore 169 from Memory Master 161 (step 233), puts the thread's index in the MFQ 164 (step 234). Then, the master-side pointer 166 is moved to the next queue, and then releases the semaphore 169 (step 235). The thread 170 waits for the response back from Memory Slave 162 (step 236). After Memory Slave 162 processes the request and puts the response in the corresponding Messaging Block 163, the thread 170 receives a signal for available response (step 237) and further processes the response (step 238).

Figure 6:
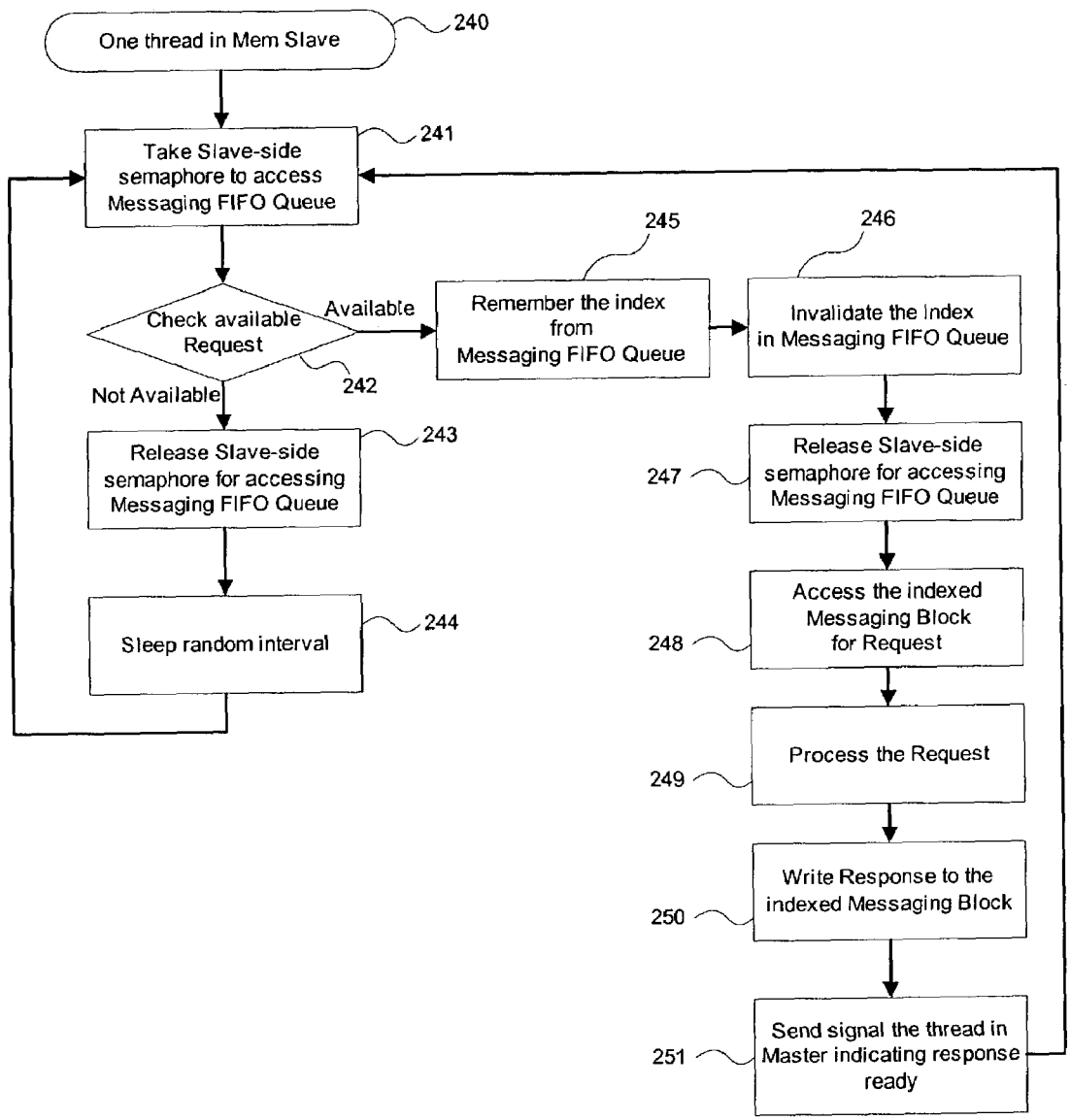
FIG. 6 illustrates a method for exchanging information between a Memory Slave thread and a Memory Master, using an MIE layer, in accordance with the present invention.

Referring to FIG. 4 and FIG. 6, one thread 168 in Memory Slave 162 takes a semaphore 167 (step 241), and checks whether the index pointed to by Slave-side pointer 165 is valid (step 242). If the index is valid, the thread 168 copies the value into thread own local variable (step 245), and the index is reset to invalid value of −1 (step 246). Next, the Slave-side pointer 165 is moves to the next entry in the Queue, and the semaphore 167 is released (step 247). The thread 168 of the Memory Slave then proceeds to access the messaging block (step 248) and process the memory request (step 249). After processing the memory request, the thread 168 puts the response results into the Messaging Block 163 (step 250) whose index matches the index 165 that the thread got from the MFQ 164. Then, the flag 171 in that Messaging Block 163 is toggled to indicate that a response is available (step 251). If no index is valid, the thread 168 releases semaphore 167 (step 243) and is put to sleep for a random interval (step 244), before checking availability again (step 241).

A memory user (also called a caller) desiring to use memory with the present invention uses memory related functions, the following memory related functions are necessarily important: (1) memory allocation ("malloc" function), (2) read from memory ("read" function), (3) write to memory ("write" function), and (4) free memory ("free" function). The following paragraphs illustrate such functions in pseudo code.

Figure 7:
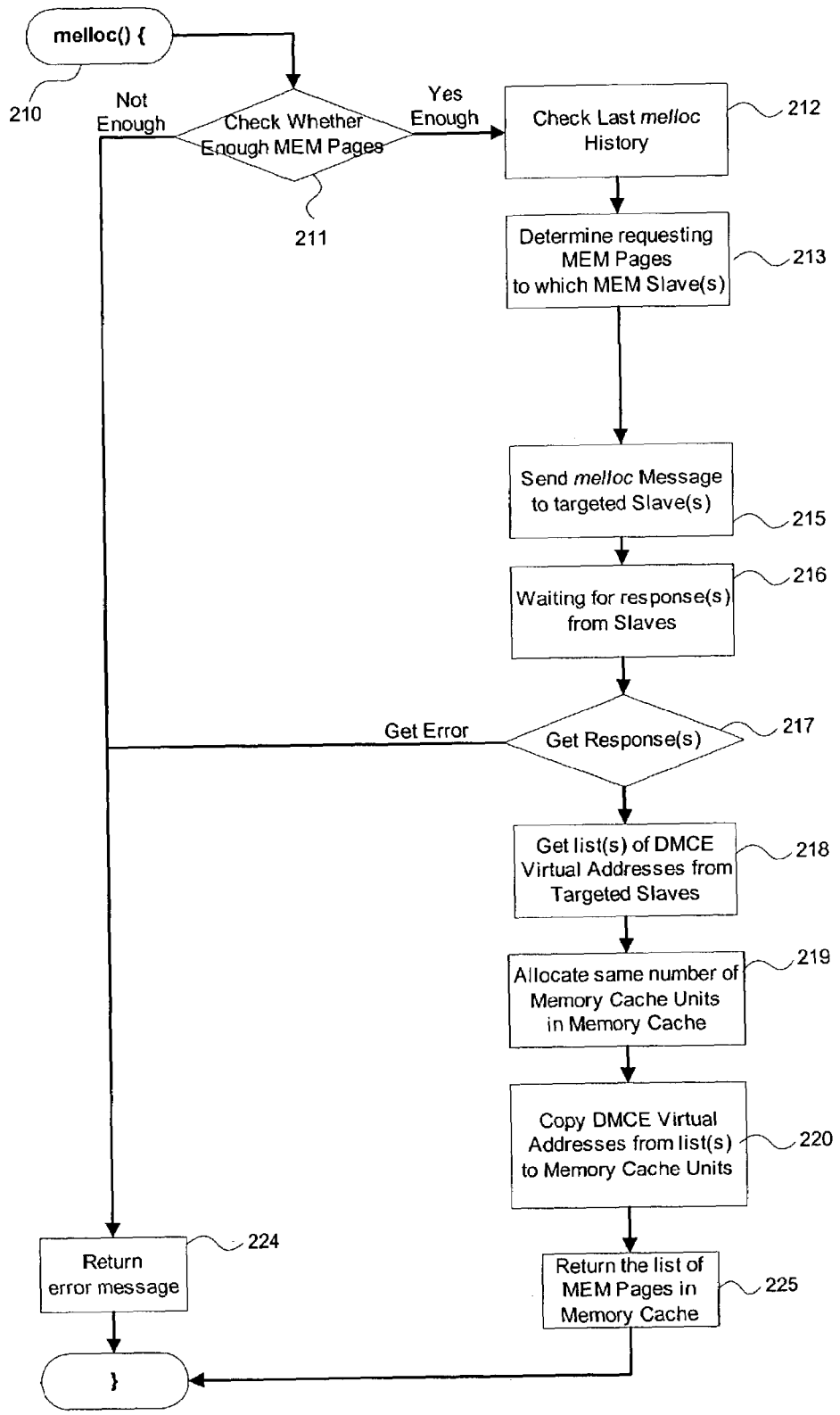
FIG. 7 illustrates a data flow diagram of a memory allocation function malloc( ) allocating Memory Pages using EMMU in accordance with the present invention.

Referring to FIG. 7, which illustrates a dataflow block diagram of "malloc" function. The following is a pseudo code of malloc:

```
malloc (the desired number of MEM Pages)
{
  Check whether there are enough memory pages (step 211), if not,
return error message (step 224);
  Based on memory allocation history (step 212), choose next one or
several Memory Slaves to request memory pages (step 213); (This is an
optional step)
  Send message through Memory Messaging Channel requesting the
desired number of MEM Pages (step 215);
  Waiting on Memory Messaging Channel for response (see FIG. 4 and
related explanation above) (step 216);
```

-continued

```
Get response from Memory Messaging Channel (step 217) or timeout;
If the response is error from Memory Slave or timeout (step 217), then
{
    Return error message (step 224);
}
If response received, get a list of DMCE Virtual Address from Slave as
response (step 218);
    Allocate the same number of Memory Cache Units in Memory Cache
(step 219);
    Copy the DMCE Virtual Address 202 from the list into Memory Cache
Unit as shown FIG. 3 (step 220);
    Return the resulting list (or array) of MEM Pages in Memory Cache
(step 225);
}
```

Still referring to FIG. 7, the steps 219 and 220 can be optional. The requested memory pages can be allocated from Memory Cache, as described in FIG. 3 and related explanations above, when memory user later tries to access the requested memory pages.

Figure 8:
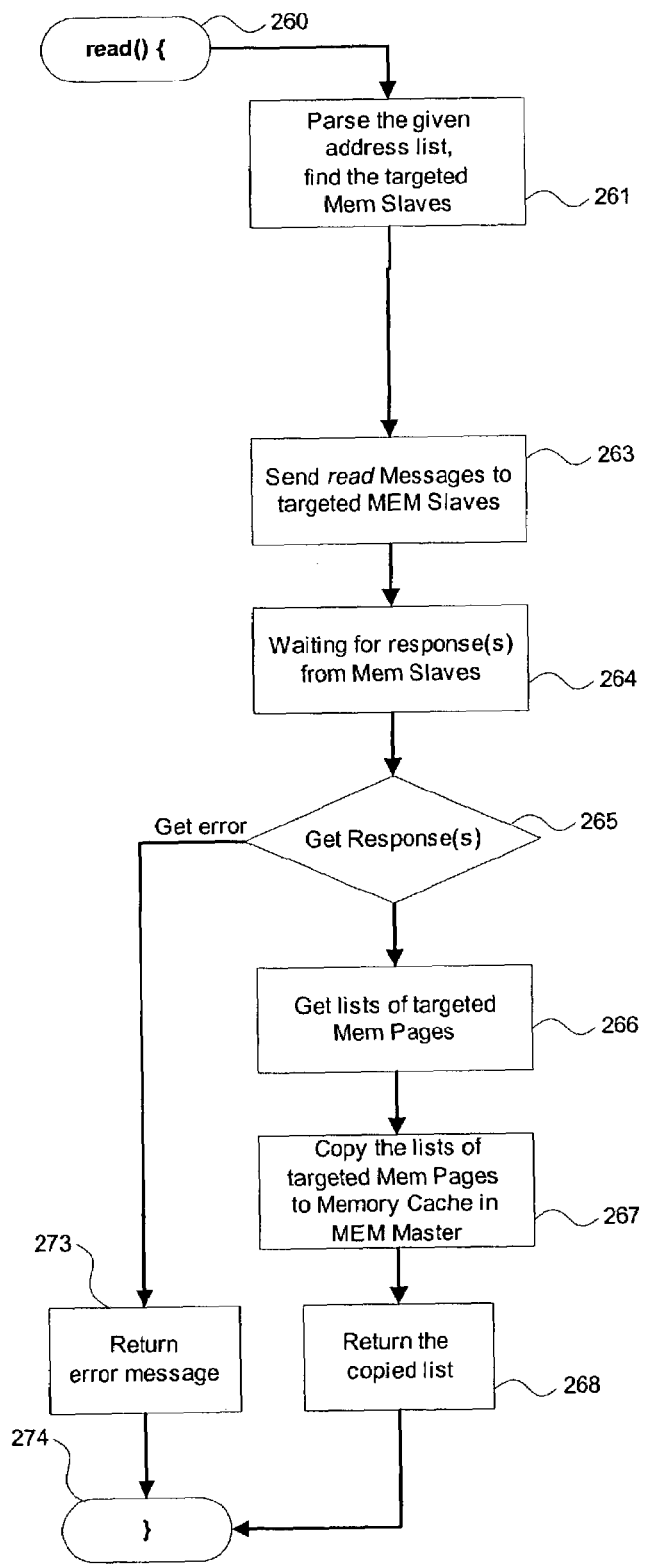
FIG. 8 illustrates a data flow diagram of a memory read function reads reading Memory Pages using EMMU in accordance with the present invention.

Referring to FIG. 8, a data flow diagram of the "read" function is illustrated. The following is a pseudo code listing of the "read" function:

```
read (pointer to a list of addresses, the number of addresses)
{ (step 260)
    Parse the list of addresses, separate the list into group based on MEM
Block ID (which is also the Memory Slave index); (step 261)
    For each group of addresses, send "read" request through Memory
Messaging Channel targeted Memory Slave; (step 263)
    Waiting for response from Memory Slave; (step 264)
    Get the responses from Memory Slaves or timeout; (step 265)
    If response is error or timeout (step 265), then
    {
        Return error message; (step 273)
    } (step 274)
    If Mem Slave receives response, get a list of the corresponding
requested MEM Pages as response (step 266);
    Copy the list of MEM Pages to Memory Cache (referring to FIG. 3 and
related explanations above) (step 267);
    Return the list of MEM Pages in Memory Cache;(step 268)
} (step 274)
```

Still referring to FIG. 8, the number of read requested memory pages may be too large to fit into Memory Cache. Then, only a first, certain number of memory pages are copied into Memory Cache. Preferably, Memory Master requests the number memory pages that can fit into Memory Cache, then requests other pages as needed.

Figure 9:
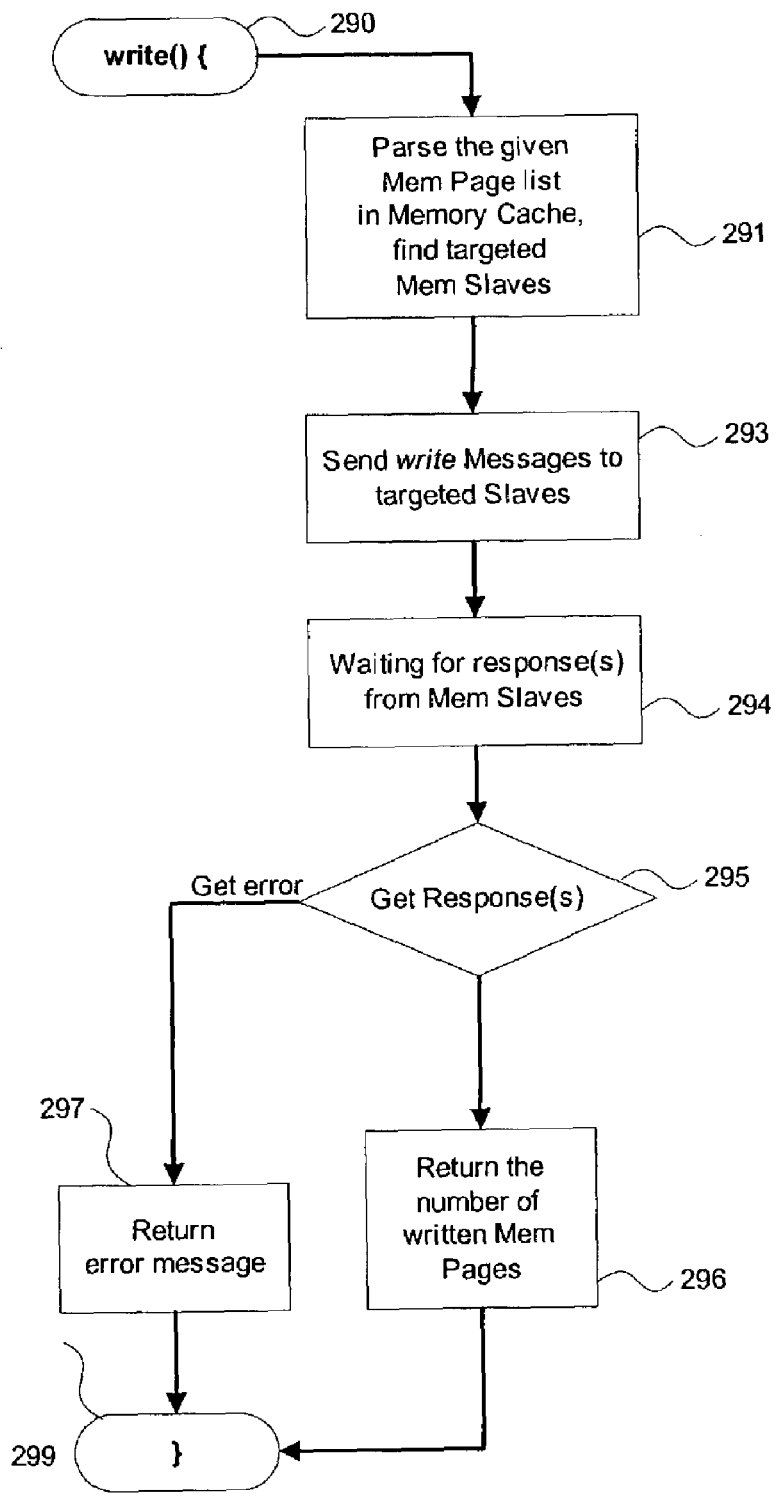
FIG. 9 illustrates a data flow diagram of a memory write function write( ) writing Memory Pages using EMMU in accordance with the present invention.

Referring to FIG. 9, a data flow diagram of the "write" function is illustrated. The following is a pseudo code for "write" function:

```
write (pointer to a list of MEM Pages, the number of MEM Pages)
{ (step 290)
    Parse the list and separate them into groups based on MEM Block ID,
and find the targeted Memory Slaves (step 291);
    Send MEM Pages to each Memory Slave for writing (step 293);
    Waiting on returning code for success or fail (step 294);
    Get the response from Memory Slaves; (step 295)
    Return error message if there is error from Memory Slave or timeout
(step 297);
    Otherwise return the number of successful written Pages (step 296).
} (step 299)
```

Figure 10:
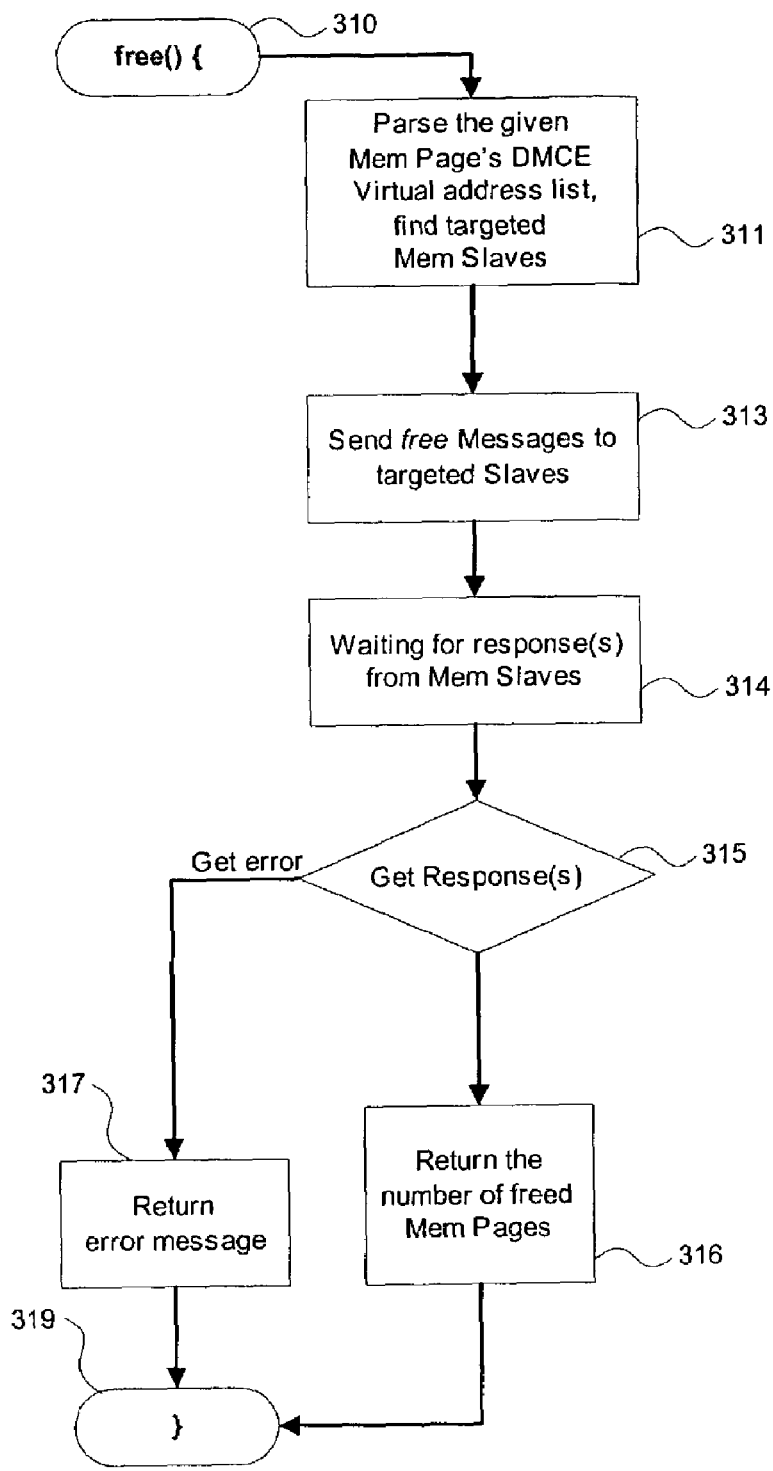
FIG. 10 illustrates a data flow diagram of a memory free function free( ) freeing Memory Pages using EMMU in accordance with the present invention.

Referring to FIG. 10, a data flow diagram of the "free" function is illustrated. The following a pseudo code for "free" function:

```
free (pointer to a list of MEM Page addresses, the number of addresses
in the list)
{ (step 310)
    Parse the list and separate them into groups based on MEM Block ID,
and find the Memory Slaves (step 311);
    Send MEM Page addresses to each Memory Slave for freeing process
(step 313);
    Waiting on returning code for success or fail (step 314);
    Get the response from Memory Slaves; (step 315)
    Return error message if there is error from Memory Slave or timeout
(step 317);
    Otherwise return the number of successful freed (step 316).
}(step 319)
```

Referring to FIG. 2, in order for the Memory Messaging Channel 153 to be useful, certain protocol in Memory Messaging Channel 153 is established so that Memory Master 155 and Memory Slave 145 can communicate with each other. As a minimum requirement, four memory actions have to be included in the protocol (called Memory Messaging Protocol or abbreviated as MMP). Those functions are: "malloc" for request of allocating memory pages; "read" for request of reading memory pages; "write" for request of writing memory pages; and "free" for request of releasing memory pages. These memory actions initiate from Master 155 as a request, and are answered by Slave 145 as a response. Additionally, for sophisticated implementation, other actions such as status monitoring information may be included in the MMP, and actions may be initiated from Slave.

Referring to FIG. 2 and FIG. 3, Memory Slave 145 has a Memory Page Pool 149 which can hold several Memory Blocks (not shown). Patent application "Invariant Memory Page Pool and Implementation Thereof," application Ser. No. 10/425,730, filed Apr. 30, 2003, Inventors Tianlong Chen, Yinong Wei, and Yingbin Wang, describes embodiments of a Memory Page Pool. One process hosting the Memory Slave 145 can have several Memory Blocks in its Memory Page Pool 149. Therefore, in order to uniquely identify a memory block from multiple Memory-Slave processes, a process identification should be included in DMCE Virtual Address 202. At the same time, referring to FIG. 3, the Memory Server ID Lookup Table 204 will keep extra information, such as an index to a process ID table for processes. In a mixture of single-computer DMCE and real networked DMCE computing environment, the Memory Server ID Lookup Table 204 tracks both the information of processes and servers.

Referring to FIG. 4, for the shared-memory Memory Messaging Channel implementation described above, the process information includes the location of Messaging Blocks 171 and the associated Messaging FIFO Queue 173 in shared memory 160 for a particular process, and possibly handling function pointers. If Memory Messaging Channel is implemented differently, then any other necessary process information is kept in Memory Server ID Lookup Table for easy and fast communication between Master 161 and Slave 162.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A system comprising:
    a device comprising a processor, a device memory and an operating system;
    a first process running in said operating system, said first process having a first process memory and a memory cache within said first process memory;
    a second process running in said operating system, said second process having a second process memory accessible to said first process; and
    a communication channel between said first process and said second process;
    wherein a total accessible memory of said first process comprises said first process memory and said second process memory.

2. A system according to claim 1 wherein said communication channel between said first process and said second process comprises a memory allocation request from said first process to said second process.

3. A system according to claim 1 wherein said communication channel between said first process and said second process comprises:
    a memory address provided by said first process to said second process, the memory address identifying a set of information to be read corresponding to said first memory address in said second process memory.

4. A system according to claim 3 wherein said set of information is stored in said memory cache of said first process.

5. A system according to claim 1 wherein said communication channel between said first process and said second process comprises:
    a memory address and a corresponding set of information provided by said first process to said second process to write to a memory location in said second process,
    wherein said memory location corresponds to said memory address given by said first process.

6. A system according to claim 1, said first process further comprises a stored content, wherein said stored content is written to said second process memory.

7. A system according to claim 1 wherein said memory cache in said first process comprises at least one memory cache unit.

8. A system according to claim 7 wherein said memory cache unit comprises at least:
    a memory address; and
    a content;
    wherein said memory address is uniquely mapped to a memory location in said second process memory; and
    wherein said content is a copy of content from said memory location in said second process memory.

9. A system according to claim 7 wherein said memory cache unit comprises at least:
    a memory address; and
    a content;
    wherein said memory address is uniquely mapped to a memory location in said second process memory; and
    wherein said content may be written to said memory location in said second process memory.

10. A system according to claim 8 wherein said memory address comprises a block ID, and an offset ID.

11. A system according to claim 10 wherein said memory address further comprises a device ID.

12. A system according to claim 8, said device memory comprising:
    a memory block comprising at least one memory unit;
    a device ID identifying said device;
    a block ID identifying said memory block in said memory of said device;
    an offset ID identifying a memory unit in said memory block; and
    a virtual address identifying said memory unit in said memory block of said device;
    wherein said virtual address contains the device ID, the block ID, and offset ID of a memory unit and said virtual address is copied into said memory cache.

13. A system according to claim 8 wherein said memory cache in said first process comprises a memory device lookup table.

14. A system according to claim 13 wherein said second process in said device comprises a device-process entry in said memory device lookup table.

15. A system according to claim 14 wherein said device-process entry for said second process further comprises information on said communication channel between said first process and said second process.

16. A system according to claim 1 wherein:
    said communication channel further comprises a First-In-First-Out (FIFO) queue;
    said first process further comprises a first thread, a corresponding messaging block for said first thread in shared memory, and a first thread ID for uniquely identifying said messaging block in said shared memory; and
    said second process further comprises a second thread;
    wherein said first thread in said first process puts requests and gets responses from said corresponding messaging block in said shared memory; and
    wherein said second thread in said second process gets requests and put responses from said corresponding messaging block in said shared memory.

17. A system according to claim 16, wherein said first thread in said first process puts request information in said messaging block memory and put its said ID of said first thread in said FIFO queue.

18. A system according to claim 16, where said second thread in said second process checks said FIFO queue for available said ID from said first thread of said first process.

19. A system according to claim 17, wherein said second thread in said second process gets a said ID of said first thread in said first process from said FIFO queue and removes the said ID from said FIFO queue, and read a request in said messaging block corresponding to said ID of said first thread in said first process.

20. A system according to claim 19, wherein said second thread in said second process puts a response based on said request from said first thread in said first process in the corresponding said messaging block of said first thread in said first process.

21. A system according to claim 20, wherein said first thread in said first process gets a response from said second thread in said second process from the corresponding said messaging block in said shared memory.

22. A method of expanding available memory in a computing environment having a device with a processor, a device memory and an operating system comprising:
   running a first process in said operating system; said first process having a first process memory and a memory cache within said first process memory;
   running a second process in said operating system, said second process having a second process memory accessible to said first process; and
   sending memory function requests between said first process and said second process through a communication channel;
   generating a memory request result; and
   caching said memory request result in said memory cache.

23. The system according to claim 16, wherein the FIFO queue has a structure selected from the group consisting of: a circular array and a linked list.

24. A system according to claim 11 wherein said memory address further comprises a process ID.

* * * * *